(12) United States Patent
Dieterle et al.

(10) Patent No.: US 7,233,118 B2
(45) Date of Patent: Jun. 19, 2007

(54) LINE DEFLECTION CIRCUIT FOR A TELEVISION RECEIVER

(75) Inventors: Franz Dieterle, Schiltach (DE); Stefan Vogel, Brigachtal (DE)

(73) Assignee: Thomson Licensing, Boulogne-Billiancourt (FR)

( * ) Notice: Subject to any disclaimer, the term of this patent is extended or adjusted under 35 U.S.C. 154(b) by 869 days.

(21) Appl. No.: 10/296,897

(22) PCT Filed: May 22, 2001

(86) PCT No.: PCT/EP01/05849

§ 371 (c)(1),
(2), (4) Date: Nov. 27, 2002

(87) PCT Pub. No.: WO01/93568

PCT Pub. Date: Dec. 6, 2001

(65) Prior Publication Data

US 2003/0184684 A1    Oct. 2, 2003

(30) Foreign Application Priority Data

May 31, 2000    (DE) .............................. 100 26 987

(51) Int. Cl.
*G09G 1/04* (2006.01)
(52) U.S. Cl. .................. 315/370; 315/371; 315/399
(58) Field of Classification Search ............. 315/370, 315/371, 399, 400, 408
See application file for complete search history.

(56) References Cited

U.S. PATENT DOCUMENTS

| 4,181,874 | A | | 1/1980 | Babcock | 315/370 |
| 4,859,915 | A | * | 8/1989 | Decraemer | 315/371 |
| 4,871,951 | A | * | 10/1989 | Teuling | 315/408 |
| 5,461,431 | A | * | 10/1995 | Takebuchi et al. | 348/806 |
| 5,949,201 | A | | 9/1999 | Suzuki et al. | 315/370 |

FOREIGN PATENT DOCUMENTS

EP    567 301 A2    10/1993

\* cited by examiner

*Primary Examiner*—David Vu
(74) *Attorney, Agent, or Firm*—Joseph J. Laks; Harvey D. Fried; Sammy S. Henig

(57) ABSTRACT

A line deflection circuit for a television receiver having a deflection coil, an S capacitor for S correction of the linearity of the deflection, the capacitor being connected in series with the deflection coil, and having means for changing over the linearity of the line deflection current for a change of the picture aspect ratio, wherein the means for changing the picture aspect ratio comprise a network formed by an inductance and a capacitance which are connected in series, wherein the network is tuned to approximately the line trace period, wherein a switch is provided to switch the network between an operative and a non-operative state, and wherein the network in its operative state is connected in parallel to the S capacitor.

3 Claims, 2 Drawing Sheets

LINE DEFLECTION CIRCUIT FOR A TELEVISION RECEIVER

Figure 1:
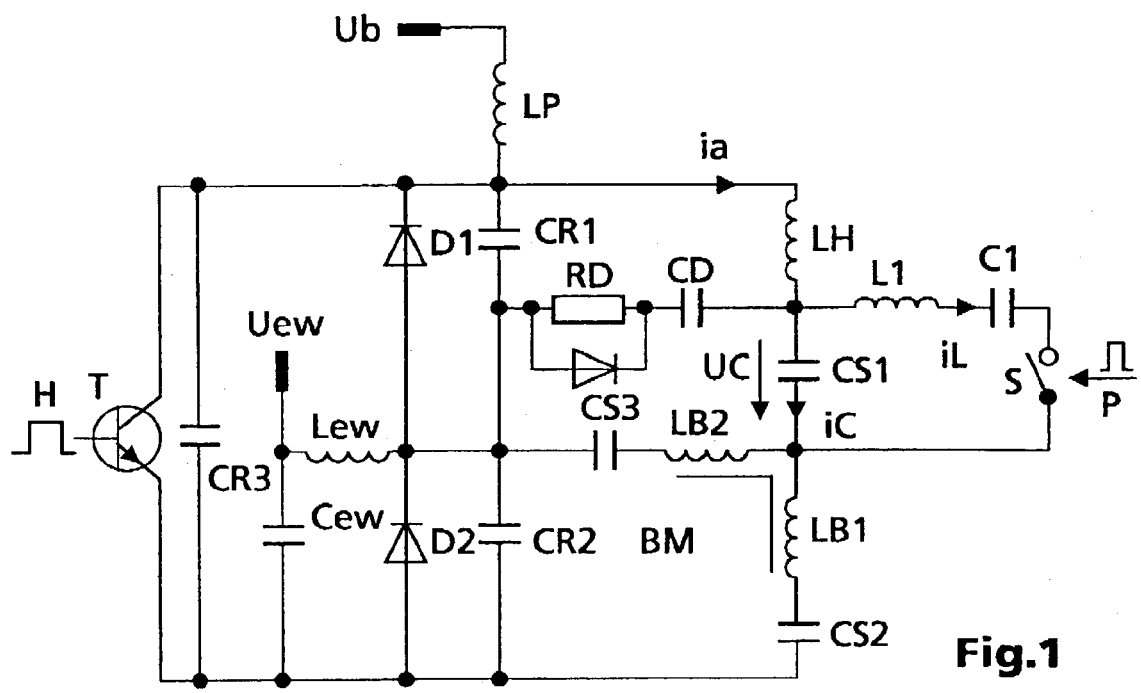

This application claims the benefit under 35 U.S.C. § 365 of International Application PCT/EP01/05849, filed May 22, 2001, which claims the benefit of German Patent Application No. 100 26 987.7 filed May 31, 2000.

The invention is based on a line deflection circuit for a television receiver in accordance with the preamble of claim 1. A circuit of this type is disclosed by WO 98/09429.

In the context of the line deflection in a television receiver, on account of the geometry of the picture tube, a deflection current having a linear sawtooth waveform over the entire line trace period would effect a high degree of non-linearity at the left-hand and right-hand edges of the picture in the form of stretching of the line content. The sawtooth-waveform deflection current must therefore be flattened to form an S shape at the beginning and at the end of the line. This linearity correction is generally referred to as S correction. It is known to effect this correction using a so-called S capacitor lying in the path of the line deflection current. Integration of the deflection current produces a parabolic voltage across the capacitor, which voltage dynamically changes the voltage across the deflection coil in the sense of the abovementioned S correction during the line trace. The extent of this S correction increases as screens become flatter. The most critical case arises with new types of picture tubes, so-called "true flat" picture tubes having an absolutely flat screen.

A further required linearity correction in the context of the line deflection is the so-called east/west pincushion correction. In this case, the amplitude of the line deflection current is modulated in a manner dependent on the vertical position by a vertical-frequency parabolic correction voltage.

A further geometry problem in the case of the abovementioned flat picture tubes consists in the so-called inner pincushion distortion, in the case of which the required S correction is not constant in the vertical direction over the screen. The inner pincushion distortion can be corrected by an S capacitor which is charged and discharged by a current modulated by the east/west correction. In the case of this circuit, it is also known to effect the entire S correction with the inner pincushion correction in a manner dependent on the amplitude of the horizontal deflection and to omit the S capacitor, that is to say to replace it by a short circuit. In this case, a generally required changeover of the S capacitor in a manner dependent on the respective picture aspect ratio is no longer required. In the case of the abovementioned "true flat" picture tube, part of the S correction together with the inner pincushion correction can be effected by means of an "anti-S capacitor" located in a diode modulator for the east/west correction. In this case, however, it is necessary to use an additional S capacitor for the complete S correction because the S correction produced by the pincushion correction is insufficient in the case of the abovementioned picture tube. However, in order to effect slight S correction, this capacitor must have a high value because most of the required S correction is effected by the correction circuit for the inner pincushion correction in order to obtain the maximum inner pincushion correction.

In many cases, it is necessary to change over the horizontal deflection in such a way that a linearity error in the form of stretching at the left-hand and right-hand edges of the picture is deliberately left or introduced. That is the case, for example, in order to represent a picture having an aspect ratio of 4:3 on a screen having an aspect ratio of 16:9 in a manner largely filling the entire screen in the horizontal direction and without appreciable distortion in the centre of the picture. That can be achieved, in principle, by the S correction described being reduced or completely switched off. However, that part of the S correction which is effected by the inner pincushion correction unfortunately cannot be suppressed or appreciably reduced without the inner pincushion correction itself being lost or excessively reduced in the process. With the abovementioned high value of the S capacitor, however, it is unrealistic in practice, in particular for cost reasons, for yet another capacitor having a high capacitance to be connected in parallel with the S capacitor for reducing the S correction. On the other hand, a short circuit, that is to say complete omission, of the S capacitor by means of a switch connected in parallel would lead to high peak currents in the switch, and the switch would have to carry the entire line deflection current of several amperes.

The invention is based on the object of providing a simple circuit for changing over the linearity for different picture aspect ratios, in the case of which the abovementioned disadvantages are avoided and, in particular, the inner pincushion equalization is not impaired.

This object is achieved by means of the invention specified in claim 1. Advantageous embodiments and developments of the invention are specified in the subclaims.

In the case of the invention, then, a frequency-dependent network tuned approximately to the line trace period, that is to say generally 52 µs, can be connected in parallel with the S capacitor by a switch which is actuated when the picture aspect ratio is changed over. The network can also be tuned to somewhat more than the line trace period. The network preferably comprises the series circuit comprising an inductance and a capacitance, a so-called L/C series resonant circuit. A sinusoidal current flows through this network, and the amplitude of this current can be set by the impedance of the network. Lower values for the capacitance and higher values for the inductance reduce this current. The method of operation of this solution is as follows: when the switch is open, that is to say when the network is disconnected, the voltage across the S capacitor has approximately a parabolic shape through integration of the sawtooth-waveform deflection current flowing through this capacitor. The customary S correction of the deflection current is then effected in order to avoid the stretching at the left-hand and right-hand edges of the picture. When the switch is closed, the voltage across the S capacitor is changed by the network across the S capacitor in such a way that the said voltage assumes the shape of an inverted "bathtub", that is to say the inverted shape of the cross section in the centre of a customary bathtub. This means that the voltage across the S capacitor is no longer parabolic, but rather has a flat profile with an essentially constant part in the centre of the line. A constant value across the S capacitor has the effect, however, that the voltage across the deflection coil no longer changes, or changes less, during the line trace period and, consequently, the S correction is to the greatest possible extent cancelled or reduced in a desirable manner.

Overall, the invention affords the following advantages: for the reduction of the S correction, in particular for a picture aspect ratio with intentional stretching at both edges of the picture, it is no longer necessary for the S capacitor to be changed over. It is possible to achieve, for example, the representation of a picture having an aspect ratio of 4:3 on a screen having an aspect ratio of 16:9 with the greatest possible filling of the entire screen in the horizontal direction and with picture geometry that is to the greatest possible extent correct in the centre of the picture. Advantageously, the inner pincushion correction is not influenced during this linearity changeover. The changeover of the S correction is also particularly simple because the current flowing in the switch begins with a zero value. Consequently, rapid current transitions do not arise in the switch.

The line deflection circuit preferably contains a so-called bridge modulator or diode modulator which, for the east/west pincushion equalization, modulates the amplitude of the line deflection current through a load changed at the vertical frequency. Such a bridge modulator contains, inter alia, a bridge coil which performs a function corresponding to the horizontal deflection coil in the modulator. In deflection circuits in which the high-voltage generation for the picture tube is coupled to the horizontal deflection, a change in the beam current gives rise to a displacement of the supply current through the primary inductance of the line transformer. The DC component effected by the displacement flows, in the event of each change, through the deflection coil, the S capacitor and also the bridge coil back to the source. It produces both charge reversal of the S capacitor and storage of energy in the bridge coil, which leads to an oscillation process which can become visible in the deflection current. In this case, the energy is exchanged between bridge coil and S capacitor, and a reaction is produced on the deflection current. If these two components have high values, the oscillation frequency is very low and not easy to suppress. In order to avoid this disadvantage, in accordance with a development of the invention, an additional capacitor is connected in series with the bridge coil and, for example, has the same value as the S capacitor. As a result, the oscillation frequency can advantageously be increased, in particular doubled, without appreciable reduction of the control range.

In another development of the invention, an attenuation network lies across the S capacitor and the S capacitor whose effect is modulated by the pincushion equalization. As a result, it is possible to suppress an oscillation between the bridge coil and the S capacitor because the current through the attenuation network no longer flows via an inductance.

Figure 2:
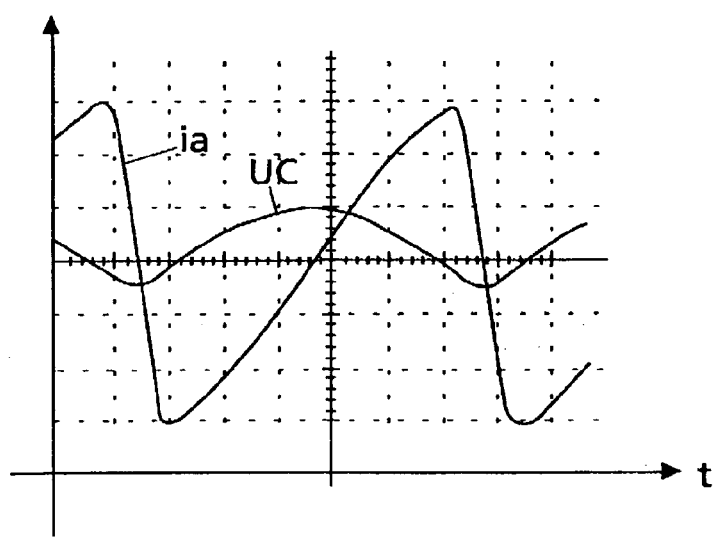
Figure 3:
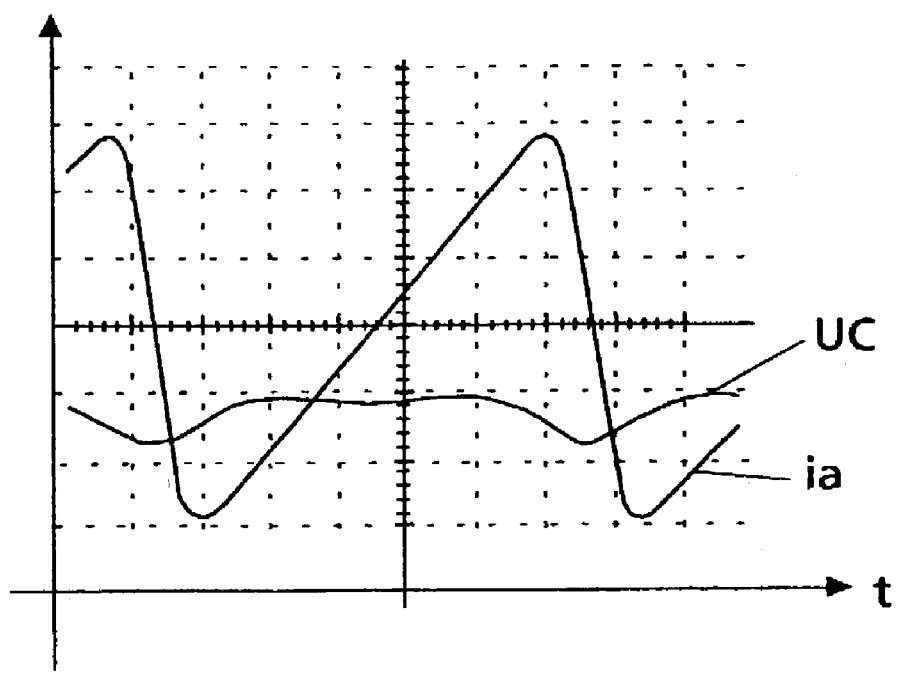
Figure 4:
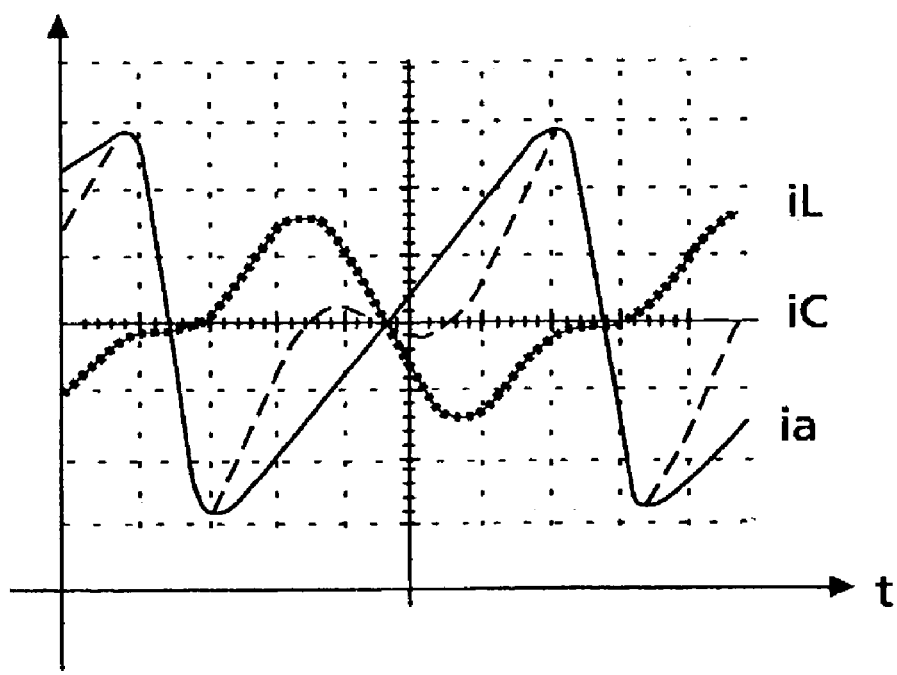

The invention is explained below with reference to the drawing, in which:

FIG. 1 shows a line deflection circuit with the circuit according to the invention, FIG. 2 shows the profile of the line deflection current and of the voltage across the S capacitor when the network is disconnected, FIG. 3 shows the line deflection current and the voltage across the S capacitor when the network is connected, and FIG. 4 shows the line deflection current, the current through the network according to the invention, and the current through the S capacitor.

FIG. 1 shows a line deflection circuit for a television receiver. The illustration includes the line output stage transistor T, which is periodically turned on by the line-frequency voltage H, the primary winding LP of the line transformer, the said primary winding being connected to the operating voltage Ub, the line deflection coil LH, the S capacitor CS1, the upper flyback diode D1, the lower flyback diode D2, the upper flyback capacitor CR1 and the lower flyback capacitor CR2. The illustration furthermore includes a so-called bridge modulator BM for the vertical-frequency modulation of the amplitude of the line deflection current by a vertical-frequency voltage. A vertical-frequency correction voltage Uew is fed via the integration capacitor Cew and the integration coil Lew as a parabolic modulation voltage to the bridge modulator BM and effects the vertical-frequency modulation of the amplitude of the line deflection current ia for the abovementioned east/west pincushion correction. The circuit described thus far is known.

A network having the inductance L1 and the capacitance C1 is provided in parallel with the S capacitor CS1, which network can be optionally connected or disconnected by the switch S. The network L1/C1 is tuned to the line trace period, generally 52 μs, or a somewhat higher value than the line trace period. When the switch S is open, the network L1/C1 is inactive. Integration of the line deflection current ia produces a parabolic voltage UC across the S capacitor CS1, which voltage effects the voltage—effective across the deflection coil LH dynamically in the sense of the S correction, that is to say an S-shaped flattening of the line deflection current at the beginning and at the end of each line. The circuit then serves for a linear, undistorted representation of a picture on the screen. When the switch S is closed, the voltage UC across the S capacitor CS1 is changed in such a way that it no longer has a parabolic shape, but rather an essentially constant or bathtub-shaped profile. The dynamic change of the voltage across the deflection coil LH is then significantly reduced, with the result that the S correction or flattening of the line deflection current is reduced in a desirable manner.

The switch S is actuated by a control pulse P. The control pulse P is generated by a detector (not illustrated in FIG. 1) which identifies the aspect ratio of the received television signal in a manner known per se. Such a detector circuit is marketed for example by Sony under the designation CXD 2057. Furthermore, it is also possible for the control pulse P to be generated manually by the user directly on the television set or via a remote control. The switch S illustrated diagrammatically in FIG. 1 can be realized by a mechanical switch, a relay, a transistor, a thyristor or another suitable electronic or electromechanical component.

FIG. 2 shows the profile of the line deflection current ia and of the parabolic voltage UC across the S capacitor CS1. It can be seen that the deflection current ia has the desired S-shaped profile with flattened portions deviating from the linear sawtooth waveform at the beginning and at the end of the line.

FIG. 3 shows the profile of the line deflection current ia and of the voltage UC across the S capacitor CSI when the network L1/C1 is connected. Thus, S correction is not effected during the time when the voltage UC is approximately constant. In contrast to FIG. 2, the deflection current ia is no longer flattened at the beginning and at the end of the line trace. As a result, the line is stretched, as is desirable for example for the representation of a picture having an aspect ratio of 4:3 on a screen having an aspect ratio of 16:9 with the entire screen width being filled, whilst accepting geometry distortion at the left-hand and right-hand edges of the picture.

FIG. 4 again shows the line deflection current ia, the current iC through the S capacitor CS1 and the current iL through the connected network for the case where the S correction is practically zero in the middle of the screen.

FIG. 1 additionally also shows the further capacitor CS2 in series with the bridge coil part LB1, with which the oscillation frequency between CS1 and LB1 is increased, for example doubled, in the manner described. Moreover, FIG. 1 also shows the attenuation network having the resistor RD, the capacitor CD and the diode DD. This network lies across both S capacitors CS1 and CS3. The effect thereby achieved is that the attenuation current can drain to earth without flowing via the bridge coil parts LB1 or LB2. This advantageously suppresses an oscillation between the bridge coil and the S capacitor CS1.

The invention claimed is:
1. A line deflection circuit for a television receiver comprising:
   a deflection coil;
   an S capacitor for S correction of the linearity of the deflection, and being connected in series with the deflection coil;
   a network for changing the picture aspect ratio over the linearity of the line deflection, and comprising an inductance and a capacitance connected in series, wherein the network is tuned to approximately the line trace period; and
   a switch coupled to the network and operative to switch the network between an operative and a non-operative state;
   wherein, the network in its operative state is connected in parallel to the S capacitor; and the deflection circuit comprises:
   a bridge modulator for vertical-frequency modulation of the amplitude of the line deflection current for east/west pincushion equalization with a first bridge coil part in series with the S capacitor and a second bridge coil part in series with a second S capacitor between a terminal of the first S capacitor and flyback capacitors; and,
   another capacitance connected in series with the first bridge coil part for increasing the oscillation frequency formed by the first S capacitor and the first bridge coil part.

2. Line deflection circuit according to claim 1, wherein the another capacitance doubles the oscillation frequency.

3. Line deflection circuit according to claim 1, wherein the value of the another capacitance corresponds to the value of the S capacitor.

* * * * *